(12) United States Patent
Ma et al.

(10) Patent No.: US 9,323,403 B2
(45) Date of Patent: Apr. 26, 2016

(54) CAPACITIVE TOUCH LCD PANEL

(71) Applicant: Shanghai Tianma Micro-Electronics Co., Ltd., Shanghai (CN)

(72) Inventors: Jun Ma, Shanghai (CN); Lihua Wang, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 37 days.

(21) Appl. No.: 13/940,752

(22) Filed: Jul. 12, 2013

(65) Prior Publication Data

US 2014/0002416 A1    Jan. 2, 2014

Related U.S. Application Data

(63) Continuation of application No. PCT/CN2012/084654, filed on Nov. 15, 2012.

(30) Foreign Application Priority Data

Jun. 29, 2012   (CN) .......................... 2012 1 0224546

(51) Int. Cl.
*G06F 3/041* (2006.01)
*G06F 3/044* (2006.01)

(52) U.S. Cl.
CPC .............. *G06F 3/044* (2013.01); *G06F 3/0412* (2013.01)

(58) Field of Classification Search
CPC .......... G02F 1/00; G06F 3/044; G06F 3/0412
USPC ......................... 345/173, 174; 349/126, 167
See application file for complete search history.

(56) References Cited

U.S. PATENT DOCUMENTS

| 7,330,230 B2* | 2/2008 | Hashimoto et al. ........... 349/113 |
| 2008/0062140 A1 | 3/2008 | Hotelling et al. |
| 2008/0204646 A1* | 8/2008 | Lim ............................ 349/126 |
| 2009/0002580 A1 | 1/2009 | Matsushima et al. |
| 2010/0045903 A1 | 2/2010 | Aruga et al. |
| 2010/0321327 A1* | 12/2010 | Liu ............................... 345/174 |
| 2013/0112542 A1 | 5/2013 | Wang et al. |
| 2013/0265527 A1 | 10/2013 | Takeuchi et al. |

FOREIGN PATENT DOCUMENTS

| CN | 1977031 A | 6/2007 |
| CN | 20128887 Y | 4/2009 |
| CN | 100476536 C | 4/2009 |
| CN | 101501613 A | 8/2009 |

(Continued)

OTHER PUBLICATIONS

Office Action in corresponding Chinese Application No. 201310264529.X, dated Aug. 25, 2015.
Supplementary Partial Search Report as received in corresponding European Application No. 12864015.8, dated Jan. 14, 2016.

*Primary Examiner* — Calvin C Ma
(74) *Attorney, Agent, or Firm* — Alston & Bird LLP

(57) ABSTRACT

A capacitive touch LCD panel of IPS or FFS mode includes a first substrate, a second substrate disposed opposite the first substrate, a liquid crystal layer disposed between the first substrate and the second substrate, and a capacitive touch unit disposed on an inner surface of the first substrate that faces toward the liquid crystal layer. The liquid crystal layer is formed of negative liquid crystal molecules having a dielectric anisotropy less than negative three.

20 Claims, 5 Drawing Sheets

(56) References Cited

FOREIGN PATENT DOCUMENTS

| | | |
|---|---|---|
| CN | 202182995 U | 4/2012 |
| CN | 102455831 A | 5/2012 |
| JP | 2010066645 A | 3/2010 |
| KR | 101148400 B1 | 5/2012 |
| TW | 201100909 A | 1/2011 |
| WO | 2012053323 A1 | 4/2012 |
| WO | 2012043386 A1 | 5/2012 |

* cited by examiner b

CAPACITIVE TOUCH LCD PANEL

CROSS-REFERENCES TO RELATED APPLICATIONS

This application claims priority to and is a continuation of international application PCT/CN2012/084654, filed on Nov. 15, 2012, entitled "CAPACITIVE TOUCH LCD PANEL", which claims priority of Chinese patent application No. 201210224546.6, entitled "CAPACITIVE TOUCH LCD PANEL", filed with the State Intellectual Property Office on Jun. 29, 2012, the contents of which are incorporated herein by reference in their entirety.

FIELD OF THE INVENTION

The invention generally relates to a liquid crystal display (LCD), and more particularly to a capacitive touch LCD panel.

BACKGROUND OF THE INVENTION

As an input medium, a touch screen is the most simple, convenient, and natural human-machine interaction means at present. Therefore, touch screens are increasingly used as inputs to various electronic products such as mobile phones, laptops, MP3/MP4 players, tablets, GPS devices, and the like. Depending on operation principles and touch information detecting media, touch screens may be classified into four types: resistive, capacitive, infrared, and surface acoustic wave. Capacitive touch screen technology is predominant due to its simple manufacture process, long product life span, and high transmittance properties.

In order to reduce costs of various electronic devices, and make electronic devices thinner and lighter, a touch screen is generally integrated in a liquid crystal display panel. One of the conventional methods that has a high integration level is described below.

A touching control unit having touch control function is provided on a CF (Color Filter) substrate of a liquid crystal display panel, and the liquid crystal display panel is driven by IPS (In-Plane Switching) or FFS (Fringe Field Switching) mode. Particularly, the touching control unit is directly disposed on a surface of a glass substrate of the CF substrate, and a color filter film of the CF substrate is disposed on a surface of the touching control unit. A thin and light LCD panel with touch control function can be obtained, thereby achieving a thinner and lighter electronic device.

However, a conventional touch LCD panel may have the problem of touch inefficiency, which is addressed by embodiments of the present invention.

BRIEF SUMMARY OF THE INVENTION

In an embodiment, a capacitive touch LCD panel driven by IPS or FFS mode includes a first substrate, a second substrate disposed opposite the first substrate, a liquid crystal layer disposed between the first substrate and the second substrate, and a capacitive touch unit disposed on a surface of the first substrate that faces toward the liquid crystal layer. In an embodiment, the liquid crystal layer may be formed of negative liquid crystal molecules.

In an embodiment, the negative liquid crystal molecules have a refractive index anisotropy value equal to or greater than 0.1.

In an embodiment, the negative liquid crystal molecules have a dielectric anisotropy less than negative 3 (−3).

In an embodiment, the negative liquid crystal molecules have a viscosity coefficient less than 150 mPa·s.

In an embodiment, the capacitive touch unit includes a first transparent electrode layer disposed on the surface of the first substrate, an insulation layer disposed on the first transparent electrode layer, and a second transparent electrode layer disposed on the insulation layer.

In an embodiment, the first transparent electrode layer is an indium tin oxide layer or an indium zinc oxide layer.

In an embodiment, the second transparent electrode layer is an indium tin oxide layer or an indium zinc oxide layer.

In an embodiment, the first transparent electrode layer includes a plurality of driving electrodes that forms a matrix having multiple rows and multiple columns. In one embodiment, each of driving electrodes has a rectangular shape.

The first transparent electrode layer also includes a plurality of sensing electrodes. Each of sensing electrodes has the shape of an elongated bar and is disposed between two adjacent columns of the driving electrodes.

In an embodiment, the second transparent electrode layer includes a plurality of bridging electrodes configured to electrically connect two adjacent driving electrodes that are disposed in a same row.

In an embodiment, the first transparent electrode layer includes a plurality of driving electrodes, the driving electrodes each have a shape of an elongated bar and are disposed parallel to one another along a first direction.

In an embodiment, the second transparent electrode layer includes a plurality of sensing electrodes, the sensing electrodes each have a shape of an elongated bar and disposed parallel to one another along a second direction that is orthogonal to the first direction.

In an embodiment, the capacitive touch LCD panel further includes a protective layer that is configured to cover a surface of the second transparent electrode.

In an embodiment, the capacitive touch LCD panel also includes a color filter film that is disposed on a surface of the protective layer.

In an embodiment, a capacitive touch panel includes: a first substrate having a first surface; a second substrate having a second surface, the first surface and the second surface facing toward one another; a liquid crystal layer disposed between the first and second substrates and formed of negative liquid crystal molecules; and a capacitive touch unit disposed on the first surface of the first substrate.

BRIEF DESCRIPTION OF THE DRAWINGS

Various advantages and benefits of the present invention may be better understood upon reading the following detailed description and accompanying drawings in which.

DETAILED DESCRIPTION OF THE INVENTION

Figure 1:
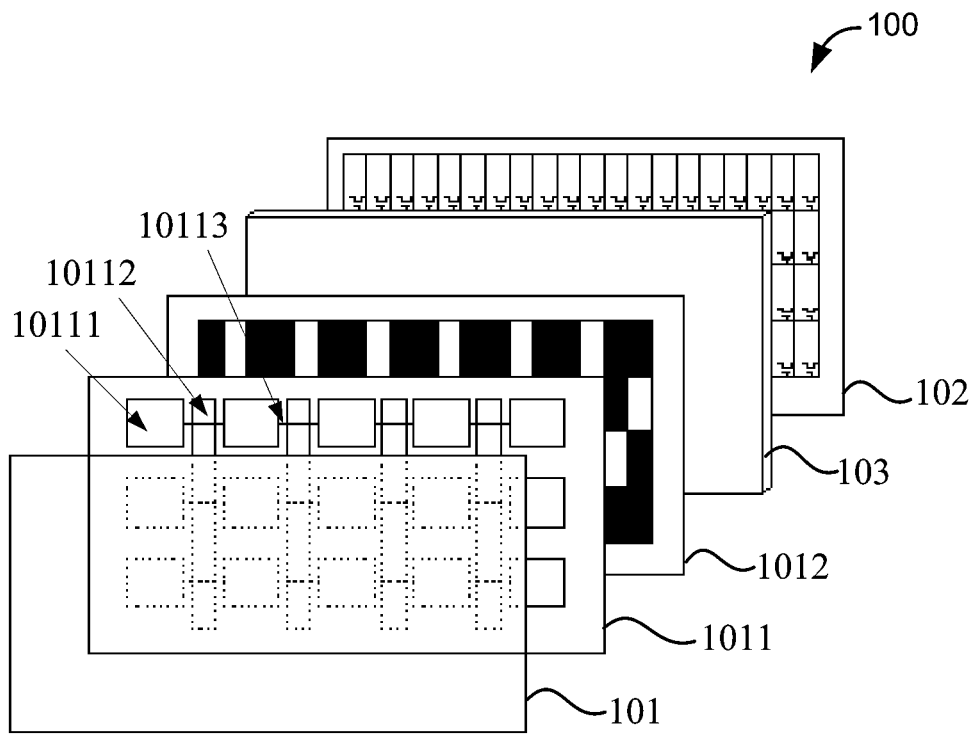
FIG. 1 is a structural schematic diagram of a capacitive touch LCD panel according to an embodiment of the invention.

Specific embodiments of the present invention will be described below. These described embodiments are only examples of the presently disclosed techniques. In an effort to provide a concise description of these embodiments, all features of an actual implementation may not be described in the specification.

As mentioned above, a conventional touch LCD panel may affect the touch effectiveness and accuracy due to touch disorder.

The inventor found that a conventional LCD panel driven by IPS or FFS mode generally adopts a liquid crystal layer formed of positive liquid crystal molecules to achieve a high response speed. When the LCD panel is in operation, the long axis of each positive liquid crystal molecule rotates in the direction along the electric field line. So when the LCD panel without a capacitive touching unit is in operation, although the rotation of the positive liquid crystal molecules may reduce the light transmittance of the display panel, the reduction in light transmittance is acceptable because the response speed of the display panel is more desirable than a degradation in display brightness. The orientation of the long axes of the liquid crystal molecules greatly affects the permittivity of the liquid crystal layer. In a LCD panel driven by the IPS or FFS mode and with a capacitive touching unit provided on its CF substrate, electrodes in the capacitive touch unit, electrodes in an array substrate, and a liquid crystal layer between the capacitive touch unit and the array substrate may form a parasitic capacitor. The permittivity change of the liquid crystal layer that functions as a medium for the parasitic capacitor may greatly affect the value of the parasitic capacitor and the electrodes in the capacitive touching unit that functions as an optional terminal for the parasitic capacitor. The permittivity change of the liquid crystal layer may generate ground noise in the capacitive touch unit that degrades the sensitivity of the capacitive touch unit. When the ground noise exceeds a predetermined level of a touch signal, the phenomenon of touch inefficiency may occur.

Embodiments of the present invention provide a capacitive touch LCD panel driven by the IPS or FFS mode. The capacitive touch LCD panel may include, in part, a first substrate, a second substrate disposed opposite the first substrate, a liquid crystal layer disposed between the first substrate and the second substrate, and a capacitive touch unit that is disposed on a surface of the first substrate facing toward the liquid crystal layer. The liquid crystal layer is formed of negative liquid crystal molecules in an embodiment.

When the capacitive touch LCD panel is in operation, the long axis of each negative liquid crystal molecule rotates in a plane, each negative liquid crystal molecule does not rotate in the direction perpendicular to the display panel, so that the long axis of each negative liquid crystal molecule will always be parallel to the display panel; therefore, the permittivity of the liquid crystal layer will not change. Moreover, the electrodes in the capacitive touch unit, the electrodes in an array substrate, the liquid crystal layer between the capacitive touch unit and the array substrate may form a parasitic capacitor. The liquid crystal layer functions as a medium for the parasitic capacitor, and the electrodes in the capacitive touch unit and the electrodes in the array substrate respectively function as one of the two terminals for the parasitic capacitor. Therefore, ground noise may be generated in the capacitive touch unit when the parasitic capacitor changes its value. However, since the permittivity of the liquid crystal layer of the present invention will not change when the capacitive touch LCD panel is in operation, so the value of the parasitic capacitor will not change. Consequently, the ground noise in the capacitive touching unit caused by a change of the parasitic capacitor is reduced, thus avoiding the phenomenon of touch inefficiency.

Furthermore, since the liquid crystal layer is formed of negative liquid crystal molecules, the display quality and light transmittance of the capacitive touch LCD panel are greatly improved as explained below.

Basic ideas of the present invention have been described above. It should be appreciated that not all features of an actual implementation will be described in the specification, as numerous variations and alternatives can be made according to system-related or cost-related constraints. Those skilled in the art may benefit from this disclosure and can make modifications to the invention without departing from the spirit of the invention; therefore, the invention is not limited to the embodiments described below.

An embodiment of the invention provides a capacitive touch LCD panel 100 driven by the IPS/FFS mode. As shown in FIG. 1, capacitive touch LCD panel 100 includes a first substrate 101, a second substrate 102 disposed opposite the first substrate, a liquid crystal layer 103 disposed between first substrate 101 and second substrate 102, and a capacitive touch unit 1011 disposed on an inner surface of the first substrate 101 that faces toward the liquid crystal layer 103.

In an embodiment, the capacitive touch unit 1011 includes a first transparent electrode layer disposed on the surface of the first substrate 101, an insulation layer disposed on the first transparent electrode layer, and a second transparent electrode layer disposed on the insulation layer. The first transparent electrode layer is an indium tin oxide layer or an indium zinc oxide layer; and the second transparent electrode layer is an indium tin oxide layer or an indium zinc oxide layer.

In an embodiment, the first transparent electrode layer includes a plurality of driving electrodes 10111 that can be formed as a driving electrode matrix of rows and columns, as shown in FIG. 1. In an embodiment, the driving electrodes can have a polygonal shape, which may be a regular shape such as a square shape. In a preferred embodiment, the driving electrodes have a rectangular shape arranged in a matrix of rows and columns, as shown in FIG. 1. The first transparent electrode layer further includes a plurality of sensing electrodes 10112 disposed between adjacent columns of driving electrodes 10111. In an embodiment, sensing electrodes 10112 have the shape of an elongated bar.

The second transparent electrode layer may include a plurality of bridging electrodes 10113 configured to electrically connect two adjacent driving electrodes 10111 that are disposed in a same row.

It is noted that FIG. 1 is only an exemplary schematic diagram and is not drawn to scale. Additionally, in an effort to explain the connection relation of the electrodes, each of the bridging electrodes 10113 is represented by a line segment connecting two adjacent driving electrodes disposed on the same row. The bridging electrodes are shown to be closer to the first substrate 101. In a preferred embodiment, the driving electrodes 10111 and the sensing electrodes 10112 are disposed on the surface of the first substrate 101, and the bridging electrodes may be disposed in a separated layer above the surface of the first substrate 101.

Referring to FIG. 1, driving electrodes 10111 in a same row are electrically connected with each other; as a result, the multiple rows of the driving electrodes receive a driving signal and scan the capacitive touching unit, while a change of capacitive value is sensed by sensing electrodes 10112 to generate a sensing signal.

In another embodiment, capacitive touch unit 1011 may include, in part, a first transparent electrode layer disposed on the surface of the first substrate 101, an insulation layer disposed on the first transparent electrode layer, and a second transparent electrode layer disposed on the insulation layer. The first transparent electrode layer is an indium tin oxide layer or an indium zinc oxide layer; and the second transparent electrode layer is an indium tin oxide layer or an indium zinc oxide layer.

Figure 2:
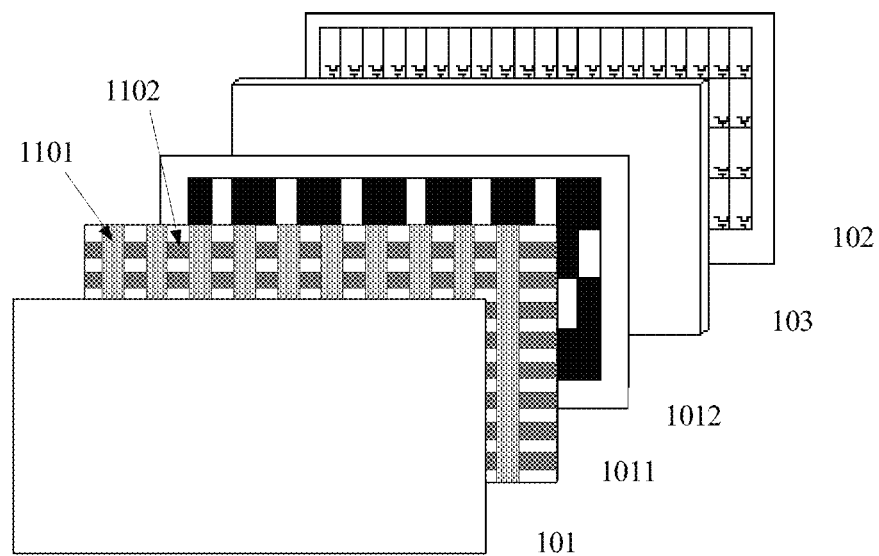
FIG. 2 is a structural schematic diagram of a capacitive touch LCD panel according to another embodiment of the invention.

Referring to FIG. 2, the first transparent electrode layer may include a plurality of driving electrodes 1101 that is disposed parallel to one another along a first direction on the surface of the first substrate 101. The driving electrodes may have an elongated bar shape to define a plurality of rows extending along the first direction.

The second transparent electrode layer includes a plurality of sensing electrodes 1102 that is disposed parallel to one another along a second direction to define a plurality of columns. The sensing electrodes may have the shape of an elongated bar that extends along the second direction and are arranged on the surface of the insulation layer. In other words, the first and second directions are orthogonal to each other. The electrodes in the capacitive touch unit may form a sensing capacitor.

In an embodiment, the bar-shaped driving electrodes 1101 receive a driving signal and scan the capacitive touch unit. A change in capacitive value of the sensing capacitor is sensed by the sensing electrodes 1102 to generate a sensing signal.

It should be noted that the driving electrodes and the sensing electrodes in the capacitive touching unit may be capacitors having other forms or shapes, as long as the capacitive touch unit is directly disposed on the surface of the first substrate 101 facing toward the liquid crystal layer 103.

In an embodiment, a protective layer (not shown) is disposed on a surface of the second transparent electrode layer. A color filter film 1012 is disposed on a surface of the protective layer. The protective layer is configured to separate the capacitive touch unit from the color filter film to protect the capacitive touch unit.

A pixel array is disposed on a surface of the second substrate 102. The pixel array may include, in part, a plurality of pixel units, a plurality of data lines, and a plurality of scan lines. The pixel units are formed by intersection of data lines and scan lines and may include each a pixel electrode, a common electrode, and a thin film transistor. The data lines and the scan lines are coupled to the pixel electrodes via the thin film transistors.

In an embodiment, a data line is connected to a source electrode of a thin film transistor; a scan line is connected to a gate electrode of the thin film transistor, and a pixel electrode is connected to a drain electrode of the thin film transistor. When the scan line provides a scanning signal to the gate electrode, the source electrode and the drain electrode of the thin film transistor are electrically connected, therefore data signals provided by the data lines pass through the source electrode and the drain electrode of the thin film transistors to reach the pixel units, so as to control a horizontal electric field applied for controlling the rotation of liquid crystal and generated between the pixel electrodes and the common electrodes, further to control the rotating direction of the liquid crystal molecules in the liquid crystal layer 103.

In an embodiment, the liquid crystal layer 103 is formed of negative liquid crystal molecules, since the product of refractive index anisotropy Δn and a box thickness d is a constant and a square of the box thickness is proportional to a response time t, i.e., $d^2 \propto t$; so when the box thickness d is reduced, it effectively reduces the response time and achieves a good display effect, so that a refractive index anisotropy value of the negative liquid crystal molecule greater than or equal to 0.1 can be obtained. The dielectric anisotropy Δ∈ is the difference between the dielectric constant in the direction of the long axis and the dielectric constant in the direction of the short axis of the liquid crystal molecule (i.e., the axis perpendicular to the long axis). The dielectric anisotropy Δ∈ is a key parameter for determining behaviors of the liquid crystal molecules in an electric field. The higher the difference, the lower the driving voltage, and the lower a consumed power. When the dielectric anisotropy Δ∈ is negative, the long axes of the molecules align perpendicularly to the electric field. In an embodiment, the dielectric anisotropy Δ∈ is less than negative 3 (−3). A viscosity coefficient directly affects the response time of the liquid crystal, and the lower the viscosity coefficient is, the faster is the response time of the liquid crystal. In an embodiment, a viscosity coefficient is less than 150 mPa·s.

The inventor performed simulations on the performance of the capacitive touch LCD panel adopting the FFS driving mode. FIG. 3a illustrates simulation results of a conventional capacitive LCD panel having a liquid crystal layer formed of positive liquid crystal molecules. FIG. 3b illustrates simulation results of a capacitive LCD panel having a liquid crystal layer formed of negative liquid crystal molecules according to the present embodiment. A same voltage is applied to both LCD panels. As is shown in FIG. 3a, under the action of the electric field, although the long axes of the positive liquid crystal molecules mainly rotate in a plane parallel to the panel, the long axes of the positive liquid crystal molecule may rotate with a certain magnitude in the direction perpendicular to the panel, causing a large change in the permittivity of the liquid crystal layer. Due to a parasitic capacitor formed by the array substrate, the capacitive touch unit, and the liquid crystal layer, the change in the permittivity of the liquid crystal layer may affect the value of the parasitic capacitor, which may couple ground noise to the capacitive touch unit. Referring to FIG. 3b, under the action of the electric field, the long axes of the negative liquid crystal molecules only rotate in a plane parallel to the panel, i.e., the long axes of the negative liquid crystal molecule will always be parallel to the panel. Because there is no rotation in the long axes of the negative molecules in the direction perpendicular to the panel, the entire permittivity of the liquid crystal layer may not change, so that the value of the parasitic capacitor also may not change. Therefore, there is a reduction of ground noise in the capacitive touch unit, and thus avoiding the phenomenon of touch inefficiency.

Furthermore, when the capacitive touch unit is in operation, an electric field perpendicular to the display panel will be generated between the capacitive touch unit and the array substrate, but this electric field perpendicular to the display panel is not required for a normal display. For the liquid crystal layer formed of positive liquid crystal molecules, the electric field causes rotation of the long axes of the positive liquid crystal molecules in a plane perpendicular to the display panel, causing a display disorder. In contrast, for the liquid crystal layer formed of negative liquid crystal molecules, as the long axes of the negative liquid crystal molecule will always be parallel to the display panel and will not be affected by the electric field perpendicular to the display panel, the display disorder may not occur.

Figure 3:
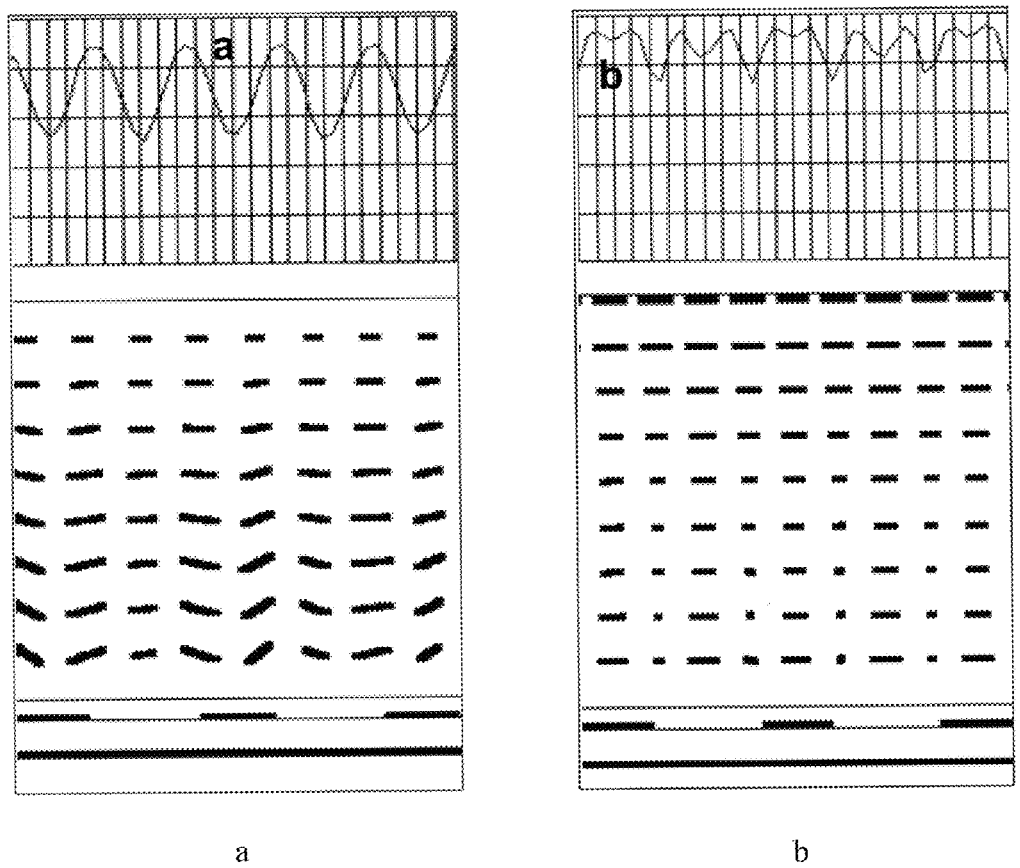
FIG. 3a shows simulation diagrams of performance tests of a prior art capacitive touch LCD panel.
FIG. 3b shows simulation diagrams of performance tests of a capacitive touch LCD panel according to an embodiment of the invention.

Additionally, as shown in FIG. 3, comparing a light transmission curve "a" in FIG. 3a to a light transmission curve "b" in FIG. 3b, the capacitive touch LCD panel according to an embodiment of the invention has a light transmittance that has a higher average light transmittance and a higher maximum level, whereas the light transmittance of the conventional capacitive touch LCD panel adopting the positive liquid crystal molecules may vary in a larger range, and its maximum value of light transmittance is lower than the maximum value of the light transmittance of the capacitive touch LCD panel according to the embodiment of the invention. It could be concluded that the capacitive touch LCD panel according to the embodiment of the present invention has a light transmittance higher than that of the conventional capacitive touch LCD panel having a liquid crystal layer formed of positive liquid crystal molecules.

Figure 4:
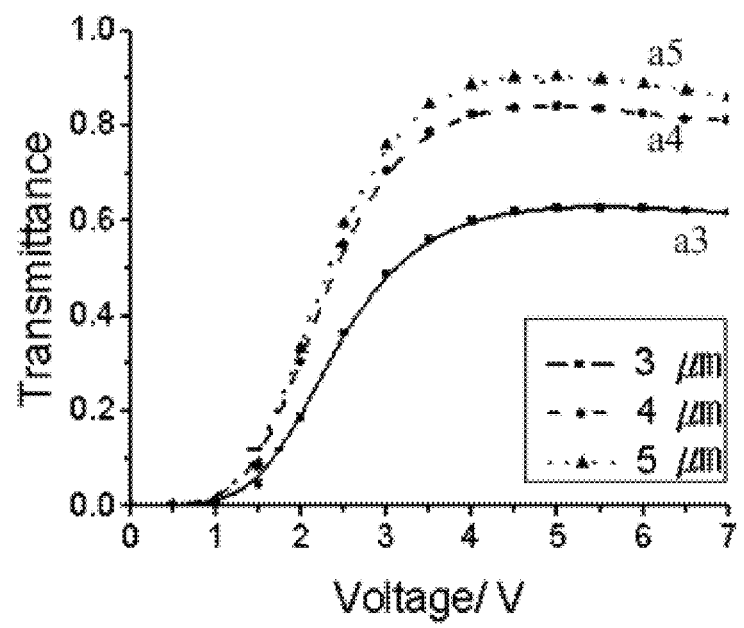
FIG. 4a shows light transmittance graphs of a capacitive touch LCD panel according to an embodiment of the invention.
FIG. 4b shows light transmittance graphs of a capacitive touch LCD panel of a prior art touch LCD panel.
Figure 4:
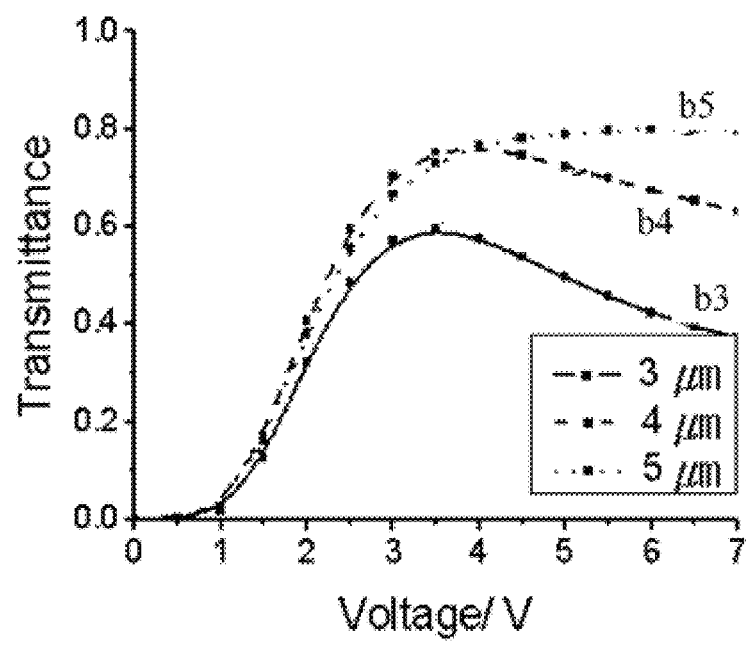

The inventor also conducted light transmittance tests for the display panels with different thicknesses of liquid crystal layers. Referring to FIG. 4, FIG. 4a shows light transmittance graphs for a capacitive touch LCD panel according to an embodiment of the present invention. The vertical axis "Transmittance" represents light transmittance and the horizontal axis "Voltage/V" represents applied voltages in units of volts (V). Curve "a3" is a light transmittance curve for a thickness of the liquid crystal layer of 3 μm; curve "a4" is a light transmittance curve for a thickness of the liquid crystal layer of 4 μm; and curve "a5" is a light transmittance curve for a thickness of the liquid crystal layer of 5 μm.

FIG. 4b shown light transmittance graphs for a conventional capacitive touch LCD panel adopting positive liquid crystal molecules, wherein the vertical axis "Transmittance" represents light transmittance, and the horizontal axis "Voltage/V" represents applied voltages in units of V. Curve "b3" denotes a light transmittance curve for a thickness of the liquid crystal layer of 3 μm, curve "b4" denotes a light transmittance curve for a thickness of the liquid crystal layer of 4 μm, and curve "b5" denotes a light transmittance curve for a thickness of the liquid crystal layer of 5 μm. Comparing FIG. 4a to FIG. 4b, the light transmittance of the capacitive touch LCD panel according to embodiments of the present invention can be seen to be higher and more stable across the applied voltages than the light transmittance of the conventional capacitive touch LCD panel adopting positive liquid crystal molecules.

An external transparent conductive layer is generally provided outside of a CF substrate of a prior art LCD panel driven by the IPS or FFS mode, so as to shield the liquid display panel from static electricity. According to an embodiment of the invention, the capacitive touch unit is disposed on the first substrate (e.g., above the CF substrate), and when the LCD panel is in operation, electrodes in the capacitive touch unit are connected to common electrodes of the array substrate. This enables the electrodes in the capacitive touch unit to have the same electric potential as the common electrodes, thereby preventing the influence of the static electricity. Therefore, advantageously in accordance with the present invention, no external transparent conductive layer is required on the surface of the first substrate.

Figure 5:
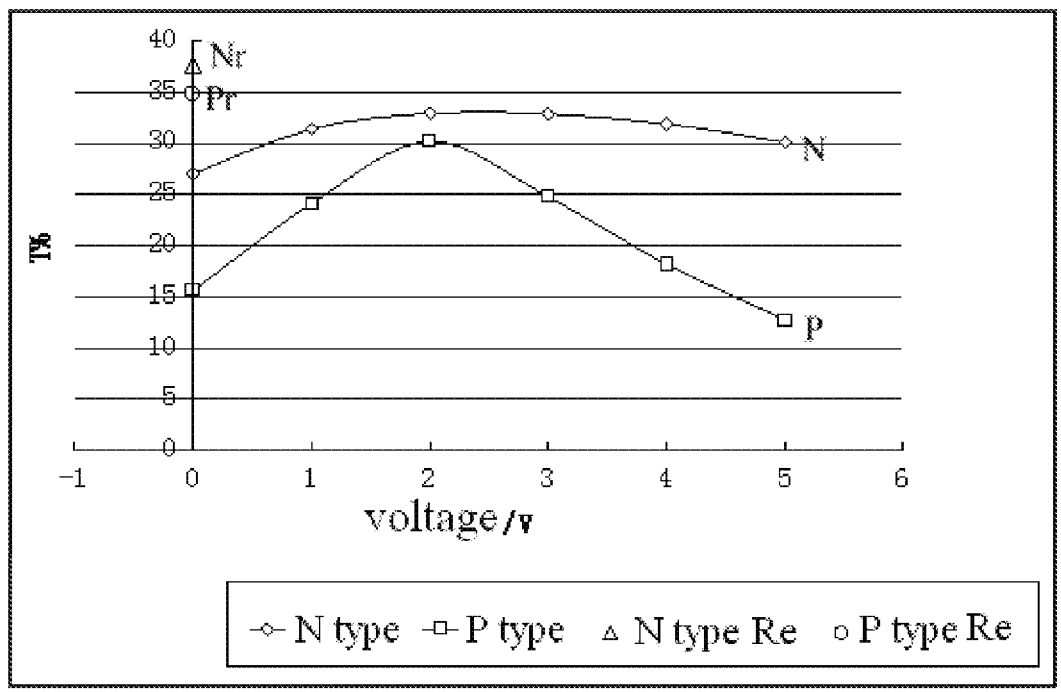
FIG. 5 shows light transmittance graphs of capacitive touch LCD panels according to embodiments of the present invention and those of conventional capacitive touch LCD panels as a function of applied voltages.

Furthermore, the inventor conducted light transmittance tests for a capacitive touch LCD panel with a transparent conductive layer and a capacitive LCD without a transparent conductive layer. As shown in FIG. 5, the vertical axis "T %" represents light transmittance, and the horizontal axis "voltage/v" represents applied voltages in units of V. Dot "Nr" denotes a light transmittance of the capacitive touch LCD panel that has a liquid crystal layer being formed of negative crystal molecules and without a transparent conductive layer, when it is powered off. Dot "Pr" denotes a light transmittance of the capacitive touch LCD panel that has a liquid crystal layer being formed of positive crystal molecules and without a transparent conductive layer, when it is powered off. As can be seen, in capacitive touch LCD panels without a transparent conductive layer and being powered off, the display panel with a liquid crystal layer formed of negative liquid crystal molecules has a higher light transmittance than that of the display panel with a liquid crystal layer formed of positive liquid crystal molecules.

Referring still to FIG. 5, curve "N" denotes a light transmittance of the capacitive touch LCD panel with a liquid crystal layer formed of negative liquid crystal molecules and with a transparent conductive layer when a voltage ranging from 0 to 5V is applied to the capacitive touch LCD panel. Curve "P" denotes a light transmittance of the capacitive touch LCD panel with a liquid crystal layer formed of positive liquid crystal molecules and with a transparent conductive layer for an applied voltage in a range from 0 to 5V. As can be seen, in the capacitive touch LCD panel applied with a voltage and having a transparent conductive layer, the display panel with a liquid crystal layer formed of negative liquid crystal molecules has a higher light transmittance than that of the display panel with a liquid crystal layer formed of positive liquid crystal molecules.

Although the present invention has been described by the embodiments shown in the drawings described above, it should be understood to a person of ordinary skill in the art that the invention is not limited to the embodiments, but rather various alternatives or modifications thereof are possible without departing from the spirit of the invention. Accordingly, the scope of the invention shall be determined by the appended claims and their equivalents.

What is claimed is:

1. A capacitive touch liquid-crystal display (LCD) panel of in-plane switching (IPS) mode or fringe field switching (FFS) mode, comprising:
   a first substrate;
   a second substrate disposed opposite the first substrate;
   a liquid crystal layer disposed between the first substrate and the second substrate; and
   a capacitive touch unit disposed on a surface of the first substrate, the surface of the first substrate facing toward the liquid crystal layer,
   wherein the liquid crystal layer is formed of one or more negative liquid crystal molecules such that no positive liquid crystal molecules are provided between the first substrate and the second substrate, and a long axis of each negative liquid crystal molecule is arranged substantially parallel to the capacitive touch LCD panel.

2. The capacitive touch LCD panel according to claim 1, wherein the negative liquid crystal molecules have a refractive-index anisotropy value equal to or greater than 0.1.

3. The capacitive touch LCD panel according to claim 1, wherein the negative liquid crystal molecules have a dielectric anisotropy less than negative 3 (−3).

4. The capacitive touch LCD panel according to claim 1, wherein the negative liquid crystal molecules have a viscosity coefficient less than 150 mPa·s.

5. The capacitive touch LCD panel according to claim 1, wherein the capacitive touch unit comprises:
   a first transparent electrode layer disposed on the surface of the first substrate;
   an insulation layer disposed on the first transparent electrode layer; and a second transparent electrode layer disposed on the insulating layer.

6. The capacitive touch LCD panel according to claim 5, wherein the first transparent electrode layer is an indium tin oxide layer or an indium zinc oxide layer.

7. The capacitive touch LCD panel according to claim 5, wherein the second transparent electrode layer is an indium tin oxide layer or an indium zinc oxide layer.

8. The capacitive touch LCD panel according to claim 5, wherein the first transparent electrode layer comprises:
   a plurality of driving electrodes forming a driving electrode matrix having a plurality of rows and a plurality of columns, each of the driving electrodes having a rectangular shape; and
   a plurality of sensing electrodes, each of the sensing electrodes having a bar shape and disposed between two adjacent columns of the driving electrodes.

9. The capacitive touch LCD panel according to claim 8, wherein the second transparent electrode layer comprises a plurality of bridging electrodes configured to electrically connect two adjacent driving electrodes disposed in a same row.

10. The capacitive touch LCD panel according to claim 5, wherein the first transparent electrode layer comprises a plurality of bar-shaped driving electrodes disposed parallel to one another along a first direction.

11. The capacitive touch LCD panel according to claim 10, wherein the second transparent electrode layer comprises:
   a plurality of bar-shaped sensing electrodes disposed parallel to one another along a second direction, the second direction being orthogonal to the first direction.

12. The capacitive touch LCD panel according to claim 5, further comprising a protective layer configured to cover a surface of the second transparent electrode layer.

13. The capacitive touch LCD panel according to claim 12, further comprising a color filter film disposed on a surface of the protective layer.

14. The capacitive touch LCD panel according to claim 1, further comprising a pixel unit array disposed on a surface of the second substrate.

15. A capacitive touch panel comprising:
   a first substrate having a first surface;
   a second substrate having a second surface, the first surface and the second surface facing toward one another;
   a liquid crystal layer disposed between the first and second substrates and formed of one or more negative liquid crystal molecules; and
   a capacitive touch unit disposed on the first surface of the first substrate;
   wherein no positive liquid crystal molecules are provided between the first substrate and the second substrate, and a long axis of each negative liquid crystal molecule is arranged substantially parallel to the capacitive touch panel.

16. The capacitive touch panel according to claim 15, further comprising a color filter film disposed between the liquid crystal layer and the capacitive touch unit.

17. The capacitive touch panel according to claim 15, wherein the capacitive touch unit comprises:
   a first transparent electrode layer disposed on the first surface of the first substrate;
   an insulation layer disposed on the first transparent electrode layer; and
   a second transparent electrode layer disposed on the insulating layer.

18. The capacitive touch panel according to claim 17, wherein the first transparent electrode layer comprises:
   a plurality of driving electrodes arranged in an array of rows and columns; and
   a plurality of bar-shaped sensing electrodes, each of the sensing electrodes disposed between two adjacent columns of the driving electrodes.

19. The capacitive touch panel according to claim 18, wherein the second transparent electrode layer comprises a plurality of bridging electrodes configured to electrically connect two adjacent driving electrodes disposed in a same row.

20. The capacitive touch panel according to claim 17, wherein the first transparent electrode layer comprises a plurality of bar-shaped driving electrodes disposed parallel to one another along a first direction, and the second transparent electrode layer comprises a plurality of bar-shaped sensing electrodes disposed parallel to one another along a second direction, the driving electrodes being orthogonal to the sensing electrodes.

* * * * *